US008635605B2

(12) United States Patent  (10) Patent No.: US 8,635,605 B2
Chancey et al.  (45) Date of Patent: Jan. 21, 2014

(54) AUTOMATED DEPLOYMENT IMPLEMENTATION WITH A DEPLOYMENT TOPOLOGY MODEL

(75) Inventors: Raphael P. Chancey, Leander, TX (US); Li-Ju Chen, Taipei (TW); Charles C. Ebbs, Cary, NC (US); Eduardo T. Kahan, Longwood, FL (US)

(73) Assignee: International Business Machines Corporation, Armonk, NY (US)

( * ) Notice: Subject to any disclaimer, the term of this patent is extended or adjusted under 35 U.S.C. 154(b) by 1792 days.

(21) Appl. No.: 11/929,485

(22) Filed: Oct. 30, 2007

(65) Prior Publication Data

US 2009/0113382 A1  Apr. 30, 2009

(51) Int. Cl.
*G06F 9/44* (2006.01)
*G06F 9/45* (2006.01)

(52) U.S. Cl.
USPC .......................... 717/143; 717/104; 717/111

(58) Field of Classification Search
None
See application file for complete search history.

(56) References Cited

U.S. PATENT DOCUMENTS

| 7,072,822 | B2 * | 7/2006 | Humenansky et al. ......... 703/22 |
| 7,191,429 | B2 | 3/2007 | Brassard et al. |
| 7,478,362 | B2 | 1/2009 | Gutz et al. |
| 7,548,843 | B2 | 6/2009 | Papaefstathiou |
| 7,599,948 | B2 | 10/2009 | Thompson et al. |
| 7,665,085 | B2 | 2/2010 | Sundararajan et al. |
| 7,673,283 | B2 * | 3/2010 | Gutz et al. .................... 717/104 |
| 7,827,524 | B2 | 11/2010 | Wilson et al. |
| 7,912,870 | B2 | 3/2011 | Chancey et al. |
| 2003/0037327 | A1 * | 2/2003 | Cicciarelli et al. ............ 717/178 |
| 2003/0074648 | A1 | 4/2003 | Brassard et al. |
| 2004/0216085 | A1 | 10/2004 | Wilson et al. |
| 2005/0096937 | A1 | 5/2005 | Subash et al. |
| 2005/0096950 | A1 | 5/2005 | Caplan et al. |
| 2005/0125419 | A1 | 6/2005 | Mizutani et al. |
| 2005/0251783 | A1 | 11/2005 | Torone et al. |
| 2006/0064178 | A1 | 3/2006 | Butterfield |
| 2007/0056019 | A1 | 3/2007 | Allen et al. |
| 2007/0067321 | A1 | 3/2007 | Bissett et al. |
| 2007/0168962 | A1 | 7/2007 | Heinke et al. |
| 2007/0180424 | A1 | 8/2007 | Kazakov et al. |
| 2008/0127047 | A1 | 5/2008 | Zhang et al. |
| 2008/0134135 | A1 | 6/2008 | Elaasar |
| 2008/0276229 | A1 | 11/2008 | Hawkins et al. |
| 2009/0070777 | A1 | 3/2009 | Chancey et al. |
| 2009/0112566 | A1 | 4/2009 | Chancey et al. |

(Continued)

OTHER PUBLICATIONS

"U.S. Appl. No. 11/929,564 Office Action", Oct. 8, 2010, 23 pages.

(Continued)

*Primary Examiner* — Chuck Kendall
(74) *Attorney, Agent, or Firm* — DeLizio Gilliam, PLLC

(57) ABSTRACT

Although a modeling language can be used to create a deployment diagram to graphically depict a deployment model, the utility of the deployment diagram is limited to easing understanding of the model. A semantically correct deployment topology model can be processed to automate deployment of a product, add-on, update, configuration, etc. A semantically correct deployment topology model can be processed to generate activities that conform to the deployment model. The activities have executable code units associated with them. Calls to the executable code units are written into one or more files in accordance with an order of the plurality of activities that conforms to the semantically correct deployment topology model.

17 Claims, 12 Drawing Sheets

(56) References Cited

U.S. PATENT DOCUMENTS

| | | |
|---|---|---|
| 2009/0112567 A1 | 4/2009 | Chancey et al. |
| 2009/0112909 A1 | 4/2009 | Chancey et al. |
| 2009/0113380 A1 | 4/2009 | Ploesser et al. |
| 2009/0113381 A1 | 4/2009 | Chancey et al. |
| 2011/0131249 A1 | 6/2011 | Chancey et al. |

OTHER PUBLICATIONS

Agrawal, Aditya et al., "A UML-based Graph Transformation Approach for Implementing Domain-Specific Model Transformations", 2003, 19 pages.

Kim, Hyungchoul et al., "Test Cases Generation from UML Activity Diagrams", *IEEE, Eighth ACIS International Conference on Software Engineering, Artificial Intelligence, Networking, and Parallel/Distributed Computing* Oct. 1, 2007, 6 pages.

Linzhang, Wang et al., "Generating Test Cases from UML Activity Diagrams based on Gray-Box Method", *IEEE, Proceedings of the 11th Asia-Pacific Software Engineering Conference (APSEC'04)* 2004, 8 pages.

Mingsong, Chen et al., "Automatic Test Case Generation for UML Activity Diagrams", *ACM* May 23, 2006, 7 pages.

"U.S. Appl. No. 11/929,903 Office Action", Dec. 10, 2009, 17 pages.

"U.S. Appl. No. 11/929,564 Final Office Action", Apr. 11, 2011, 20 Pages.

Anastasiya, Sotnykova, "Semantic validation in spatio-temporal schema integration", 2006, 177 pages.

Arlow, Jim, "UML and the Unified Process", Jan. 2005, 488 pages.

"U.S. Appl. No. 11/929,903 Final Office Action", Apr. 30, 2010, 18 pages.

"U.S. Appl. No. 11/929,100 Office Action", Jun. 9, 2011, 14 pages.

U.S. Appl. No. 11/853,975, filed Sep. 12, 2007, Chancey, Raphael P., et al.

Cervenka, Radovan "Modeling Notation Source Styx" *Foundation for Intelligent Physical Agents*.

Meyer, Bertrand "UML: The Positive Spin" *Eiffel Software*, http://archive.eiffel.com/doc/manuals/technology/bmarticles/uml/page.html (1 of 6) [Oct. 6, 2007 12:38:05 PM].

Mikunov, Alex "The Implementation of Model Constraints in .Net", *The Code Project TM*, http://www.codeproject.com/dotnet/model_constraints_in_net.asp (Retreived Oct. 13, 2007).

U.S. Appl. No. 13/457,060, filed Apr. 26, 2012, Chancey, Raphael P., et al.

"U.S. Appl. No. 11/929,100 Office Action", Nov. 28, 2011, 23 pages.

"U.S. Appl. No. 13/017,829 Office Action", Dec. 16, 2011, 16 pages.

"Unified Modeling Language: Infrastructure", version 2.0 Jan. 6, 2003, 187 pages.

"U.S. Appl. No. 11/929,065 Office Action", Jun. 14, 2011, 13 pages.

"U.S. Appl. No. 13/017,829 Office Action", Jul. 6, 2011, 13 pages.

"U.S. Appl. No. 11/929,100 Final Office Action", Jul. 5, 2012, 24 pages.

\* cited by examiner

AUTOMATED DEPLOYMENT IMPLEMENTATION WITH A DEPLOYMENT TOPOLOGY MODEL

TECHNICAL FIELD

Embodiments of the inventive subject matter generally relate to the field of deployment modeling, and, more particularly, to automated deployment implementation with a deployment topology model.

BACKGROUND

The Unified Modeling Language™ (UML™) is the industry-standard language for specifying, visualizing, constructing, and documenting the artifacts of software systems. UML can be used to model deployment of an application, upgrade, configuration, etc., in an environment.

One of the standard UML diagrams is a deployment diagram, which graphically depicts a deployment model. The deployment diagram shows deployment to components of the environment (e.g., servers, clients, connections, virtual machines, etc.). A deployment diagram can visually depict where the different components of the system will physically run and how they will communicate with each other.

SUMMARY

A method comprises processing data that represents a semantically correct deployment topology model. The deployment topology model is comprised of nodes and connections. A plurality of activities that correspond to the nodes and connections as occurring in the deployment topology model are determined. Executable code units associated with the plurality of activities are determined. Calls to the executable code units are written into one or more files in accordance with an order of the plurality of activities that conforms to the semantically correct deployment topology model.

DESCRIPTION OF THE DRAWINGS

The present embodiments may be better understood, and numerous objects, features, and advantages made apparent to those skilled in the art by referencing the accompanying drawings.

FIG. 2 depicts a first portion of the flowchart of example operations to automatically generate a deployment activity model from a semantically correct deployment topology model.

FIG. 3 depicts a second portion of the flowchart of example operations to automatically generate a deployment activity model from a semantically correct deployment topology model.

FIG. 4 depicts a third portion of the flowchart of example operations to automatically generate a deployment activity model from a semantically correct deployment topology model.

FIG. 5 depicts a fourth portion of the flowchart of example operations to automatically generate a deployment activity model from a semantically correct deployment topology model.

FIGS. 6-7 depict a flowchart of example operations for generating a linear representation of a semantically correct deployment activity model.

FIG. 6 depicts a first portion of the flowchart of example operations for generating a linear representation of a semantically correct deployment activity model.

FIG. 7 depicts a second portion of the flowchart of example operations for generating an intermediate representation of a semantically correct deployment activity model.

FIG. 8 depicts a flowchart of example operations for generating executable code to orchestrate performance of the activities of the deployment activity model.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Although a modeling language can be used to create a deployment diagram to graphically depict a deployment model, the utility of the deployment diagram is limited to easing understanding of the model. Automated generation of executable deployment code that implements a deployment model allows benefits of modeling to be realized. Automated generation of executable deployment code from a deployment model provides efficiency in time and resource utilization.

Figure 1:
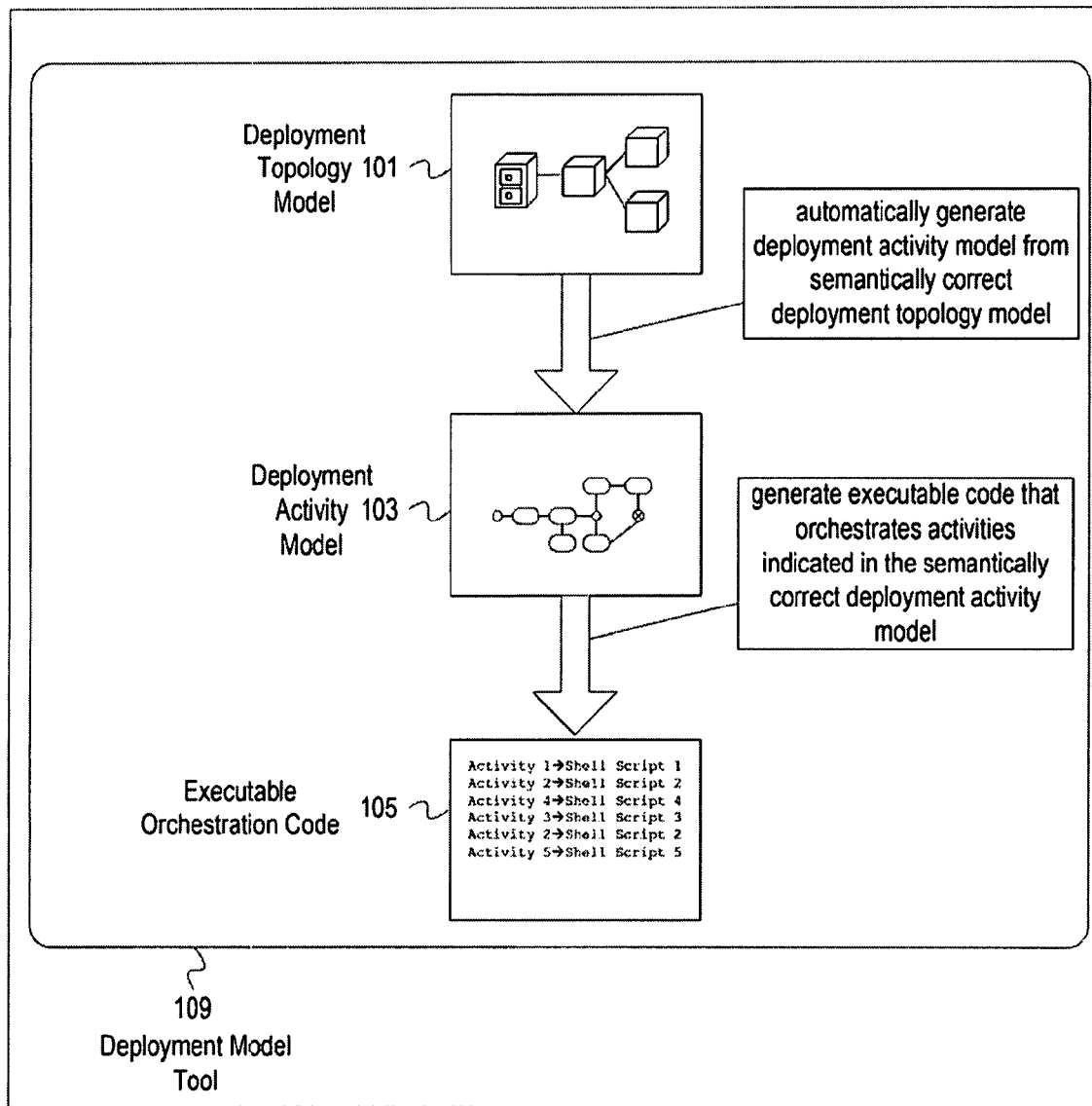
FIG. 1 conceptually depicts an example tool that automates generation of executable code from a deployment model.
Figure 1:
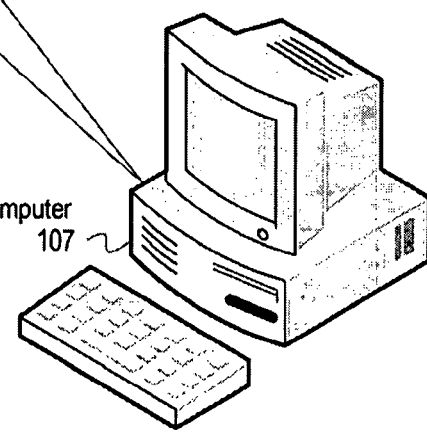

FIG. 1 conceptually depicts an example tool that automates generation of executable code from a deployment model. A computer 107 hosts a deployment tool 109. Although the tool in FIG. 1 is referred to as a deployment model tool, embodiments are not limited to deployment model tools. Toolkits that embody functionalities described herein can build various models in accordance with various modeling languages (e.g., IDEF, SysML, FMC, etc.). The deployment tool 109 allows a deployment topology model 101 to be created. Although not shown, an example of the deployment tool 109 would include a palette of diagram elements (e.g., representations of nodes, connections, etc.). The modeler would drag and drop these elements into a region for building a diagram or multiple diagrams (e.g., nested diagrams) that graphically depict a model. The deployment tool 109 ensures that the deployment topology model 101 is semantically correct. For example, as a user drops the element to create the deployment topology model 101, the deployment model tool 109 validates the model or diagram and generates warnings that attributes have not been defined, that relationships violate constraints, that values are not allowed, elements of the model violate semantics, etc.

The deployment tool 109 automatically generates a deployment activity model 103 from the deployment topology model 101. A modeler uses the deployment tool 109 to create diagrams that visually depict a deployment activity model. With the deployment model tool 109, a user can define values and/or modify the deployment activity model 103. The deployment model tool 109 can also automatically define attributes (e.g., use default values, read values from a file, etc.). As with the deployment topology model 101, the deployment model tool 109 ensures that the deployment activity model 103 is semantically correct ("validates the model").

After validating the deployment activity model 103, the deployment model tool 109 generates executable code 105 that orchestrates performance of activities indicated the deployment activity model 103. The deployment model tool 109 walks the deployment activity model 103 and looks up executable code units associated with the activities indicated in the deployment activity model 103. The deployment model tool 109 creates calls to these code units for the activities traversed in the deployment activity model 103 to generate the executable activity orchestration code 105. With the automatically generated executable orchestration code 105, deployment can be carried out over an enterprise system. The executable orchestration code 105 can deploy an application, configuration, add-on, update, etc.

The generation of executable orchestration code to carry out a deployment over a system was depicted in FIG. 1 as involving generation of a deployment activity model from a semantically correct deployment topology model and generation of the executable orchestration code from the deployment activity model, which was also semantically correct. These operations to generate the executable orchestration code may be visible or "under the covers." For instance, a user may only see generation of the executable orchestration code after creating a semantically correct deployment topology model. Regardless of visibility, the deployment model tool traverses a representation (e.g., one or more data structures) of the one or more diagrams of the deployment topology model. The deployment model tool begins creating deployment activity models until a valid deployment activity model is created. Although the intermediate deployment activity models (assuming the first traversal attempt of the deployment topology model is unsuccessful) are discarded in some embodiments, other embodiments store the representations of the intermediate failed deployment activity models for analysis (e.g., analysis for the tool to learn, analysis to discover values for automatically defining attributes, etc.).

Figure 2:
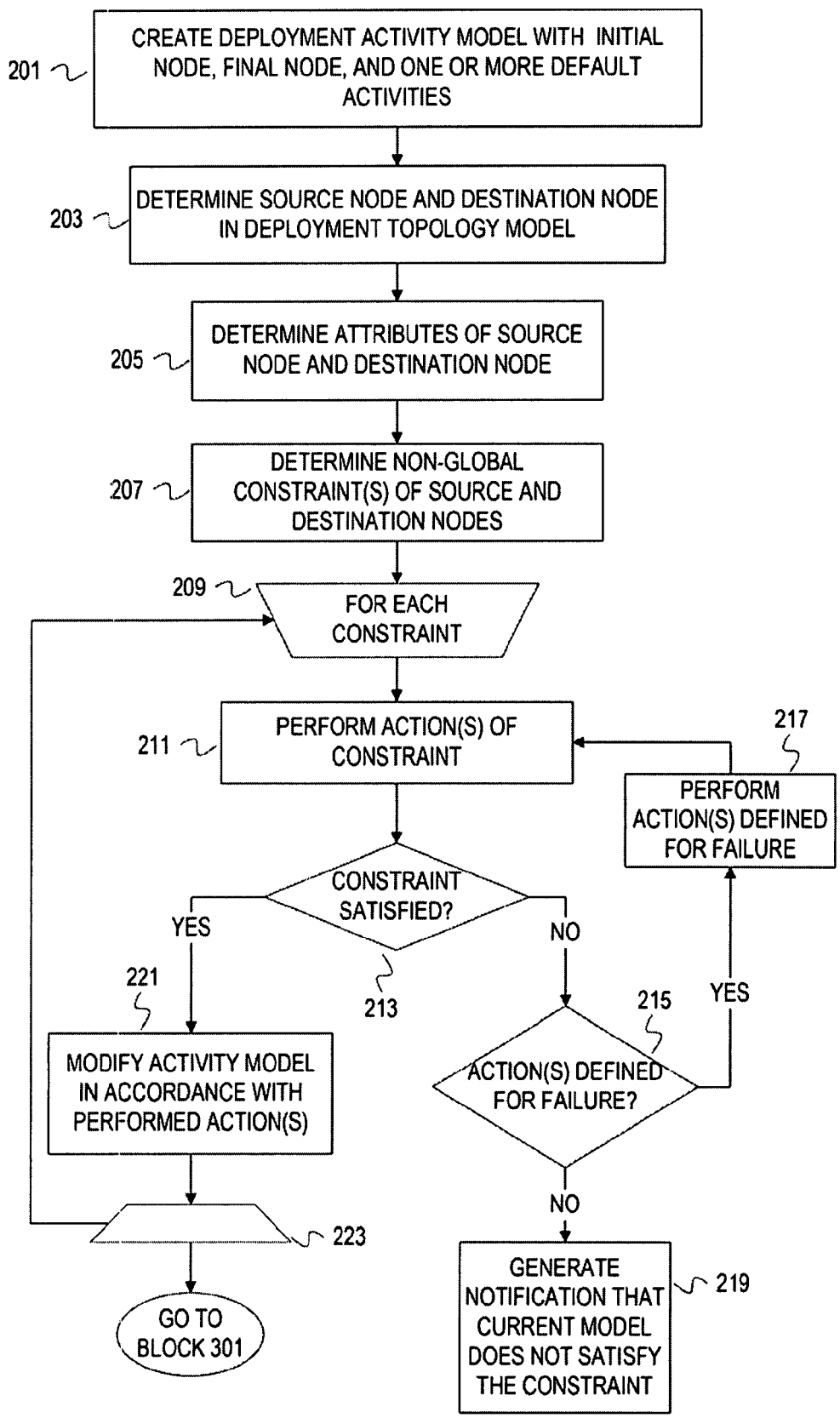
FIGS. 2-5 depict a flowchart of example operations to automatically generate a deployment activity model from a semantically correct deployment topology model.

FIGS. 2-5 depict a flowchart of example operations to automatically generate a deployment activity model from a semantically correct deployment topology model. FIG. 2 depicts a first portion of the flowchart of example operations to automatically generate a deployment activity model from a semantically correct deployment topology model. At block 201, a deployment activity model is created with an initial node, final node, and one or more default activities. For instance, the deployment topology model may model deployment of an application X. A set of default activities are defined for application X, so that all deployment models for application X include these default activities. At block 203, a source node and a destination node are determined in the deployment topology model. Deployment may be from one or multiples machines or sources represented by source nodes. In addition, there may be multiple targets of a deployment. For example, files for deployment of application X may be sourced from three servers, and may be installed on a plurality of clients distributed over a global network. At block 205, attributes of the source node and destination node are determined. At block 207, a non-global constraint(s) of the source and destination nodes is determined.

At block 209, a loop of operations begins for each constraint. Control flows from block 209 to block 211. At block 211, one or more action for the constraint are performed. At block 213, it is determined if the constraint is satisfied. If the constraint is not satisfied, then control flows to block 215. If the constraint is satisfied, then control flows to block 221.

At block 215, it is determined if an action has been defined for failure of the constraint. If an action is defined for failure, then control flows to block 217. If an action has not been defined, then control flows to block 219.

At block 217, the action(s) defined for the failure is performed. Control flows from block 217 back to block 211 to attempt satisfying the constraint again.

At block 219, a notification is generated that the current deployment activity model does not satisfy the constraint. The notification informs a user as to the constraint that has failed to allow the user to remedy the failure. For instance, a prompt is displayed for a user to define an attribute that is needed to satisfy a constraint.

At block 221, the deployment activity model is modified in accordance with the one or more performed actions (e.g., an activity is added to the deployment activity model, a relationship is added, etc.). Control flows from block 221 to block 223. The loop of operations terminates at block 223. If each constraint has been evaluated, then control flows to block 301 of FIG. 3. If there are additional constraints, then control flows back to block 209.

Figure 3:
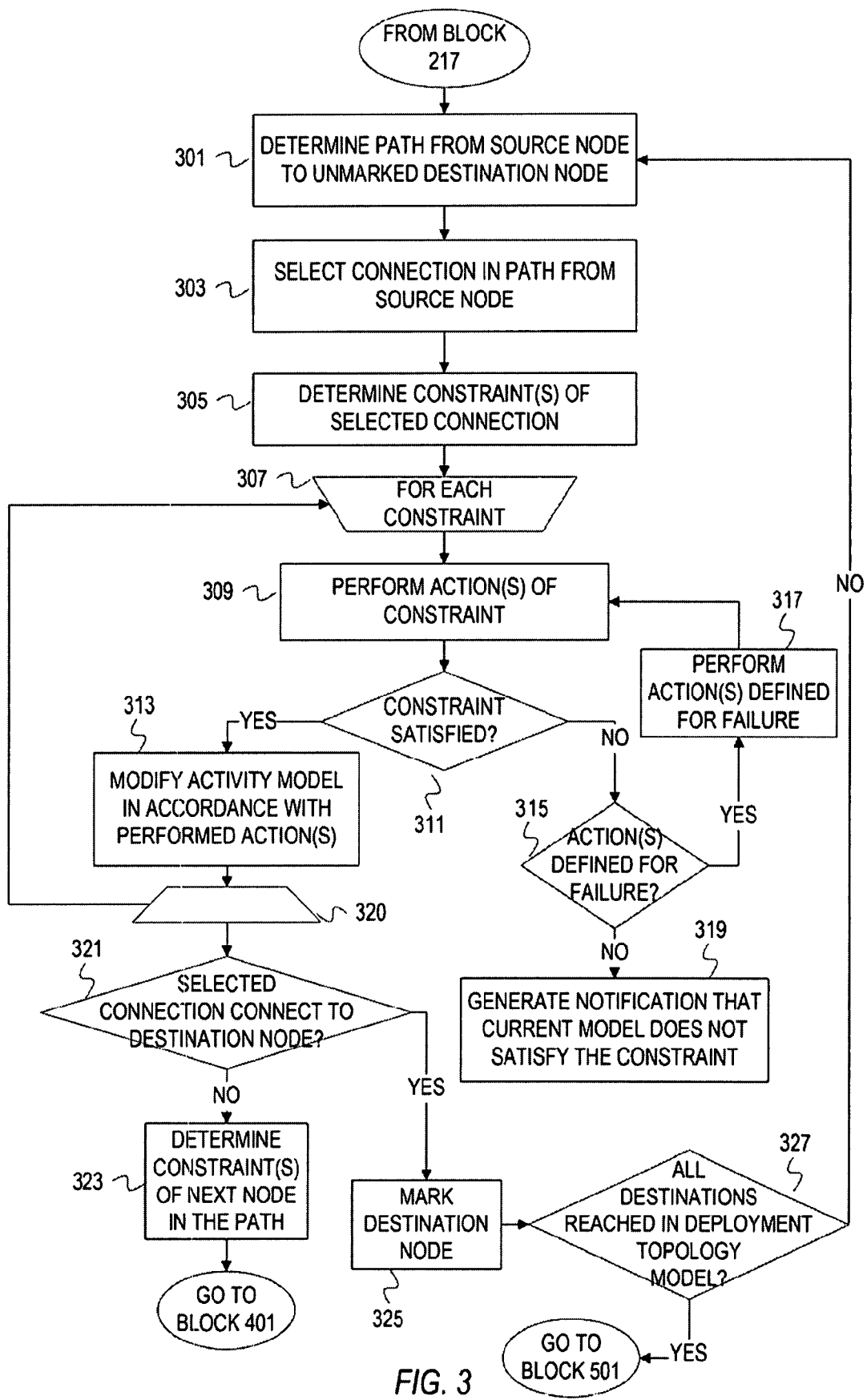

FIG. 3 depicts a second portion of the flowchart of example operations to automatically generate a deployment activity model from a semantically correct deployment topology model. At block 301, a path in the deployment topology model is determined from the source node to an unmarked destination node. At block 303, a connection in the path from the source node is selected. The source node and activity nodes may have multiple connections. At block 305, one or more constraints are determined for the selected connection. Of course, constraints may also have been determined for the source node. At block 307, a loop of operations begins for each constraint. Control flows from block 307 to block 309.

At block 309, one or more actions for the connection constraint are performed. At block 311, it is determined if the constraint is satisfied. If the constraint is not satisfied, then control flows to block 315. If the constraint is satisfied, then control flows to block 313.

At block 315, it is determined if an action has been defined for failure of the connection constraint if an action is defined for failure, then control flows to block 317. If an action has not been defined, then control flows to block 319.

At block 317, the action(s) defined for the failure is performed. Control flows from block 317 back to block 309 to attempt satisfying the connection constraint again.

At block 319, a notification is generated that the current deployment activity model does not satisfy the constraint.

At block 313, the deployment activity model is modified in accordance with the one or more performed actions of the constraint. Control flows from block 313 to block 320, which terminates the loop if all constraints have been evaluated. Otherwise, control flows back to block 307.

After all constraints have been evaluated, control flows to block 321. At block 321, it is determined if the selected connection connects to the unmarked destination node. If the connection connects to the destination node, then control flows to block 325. If the connection does not connect to the destination node, then control flows to block 323.

At block 325, the destination node is marked. At block 327, it is determined if all destination nodes in the deployment topology model have been reached. If all destination nodes have not been reached, then control flows to block 301. If all destination nodes have been reached, then control flows to block 501 of FIG. 1.

If the connection did not connect to the destination node, then a constraint(s) of the next node in the path is determined at block 323. Control flows from block 323 to block 401 of FIG. 4.

Figure 4:
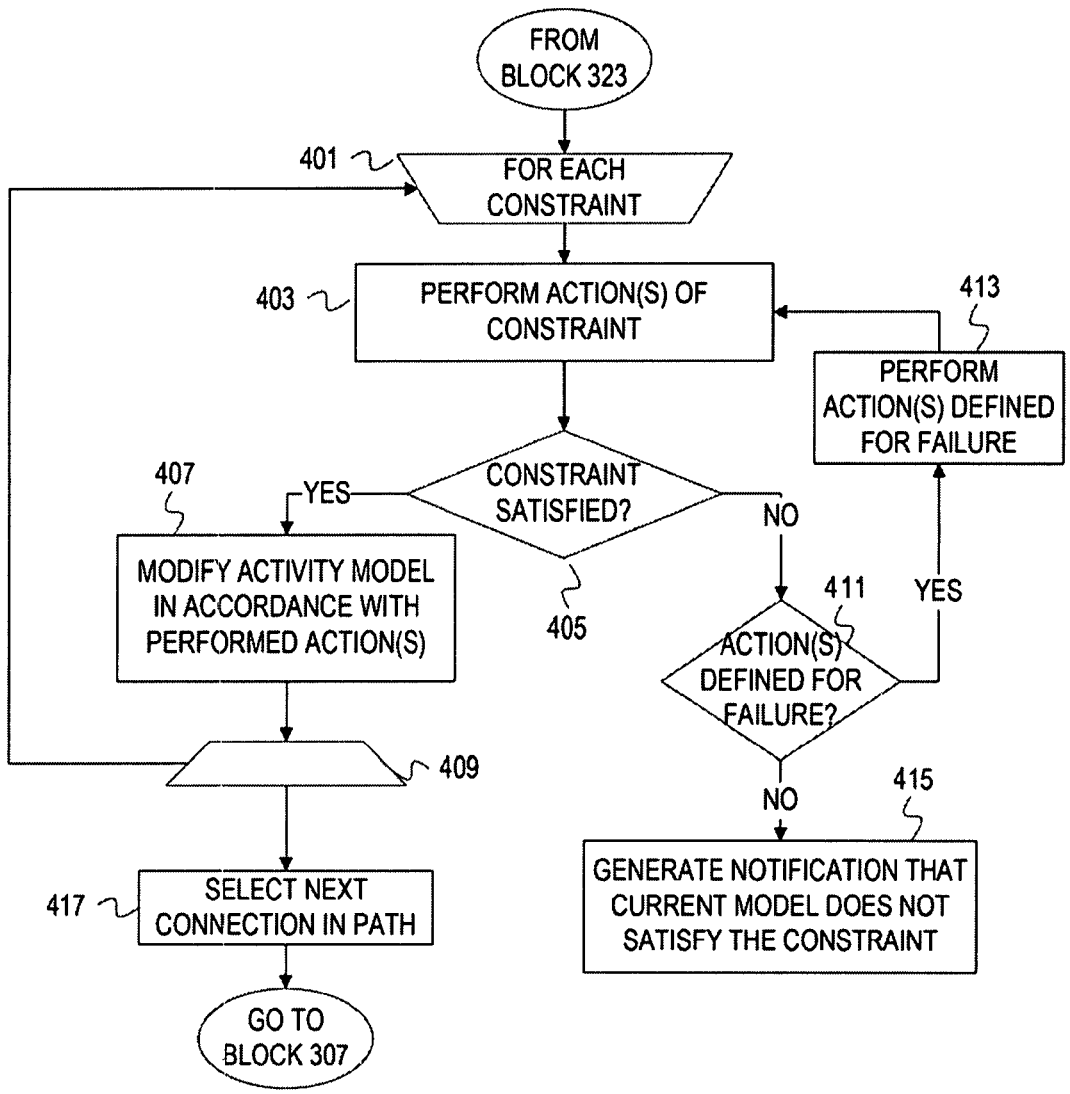

FIG. 4 depicts a third portion of the flowchart of example operations to automatically generate a deployment activity model from a semantically correct deployment topology model. At block 401, a loop of operations begins for each determined constraint of the next node. At block 403, one or more actions of the constraint are performed. At block 405, it is determined if the constraint is satisfied. If the constraint is satisfied, then control flows to block 407. If the constraint is not satisfied, then control flows to block 411.

At block 411, it is determined if an action has been defined for failure of the node constraint. If an action is defined for failure, then control flows to block 413. If an action has not been defined, then control flows to block 415.

At block 413, the action(s) defined for the failure is performed. Control flows from block 413 back to block 403 to attempt satisfying the node constraint again.

At block 415, a notification is generated that the current deployment activity model does not satisfy the node constraint.

At block 407, the deployment activity model is modified in accordance with the one or more performed actions of the node constraint. Control flows from block 407 to block 409, which terminates the loop if all constraints of the node have been evaluated. Otherwise, control flows back to block 401.

If all constraints of the node have been evaluated, then the next connection is selected at block 417. Control flows from block 417 back to block 307 of FIG. 3.

Figure 5:
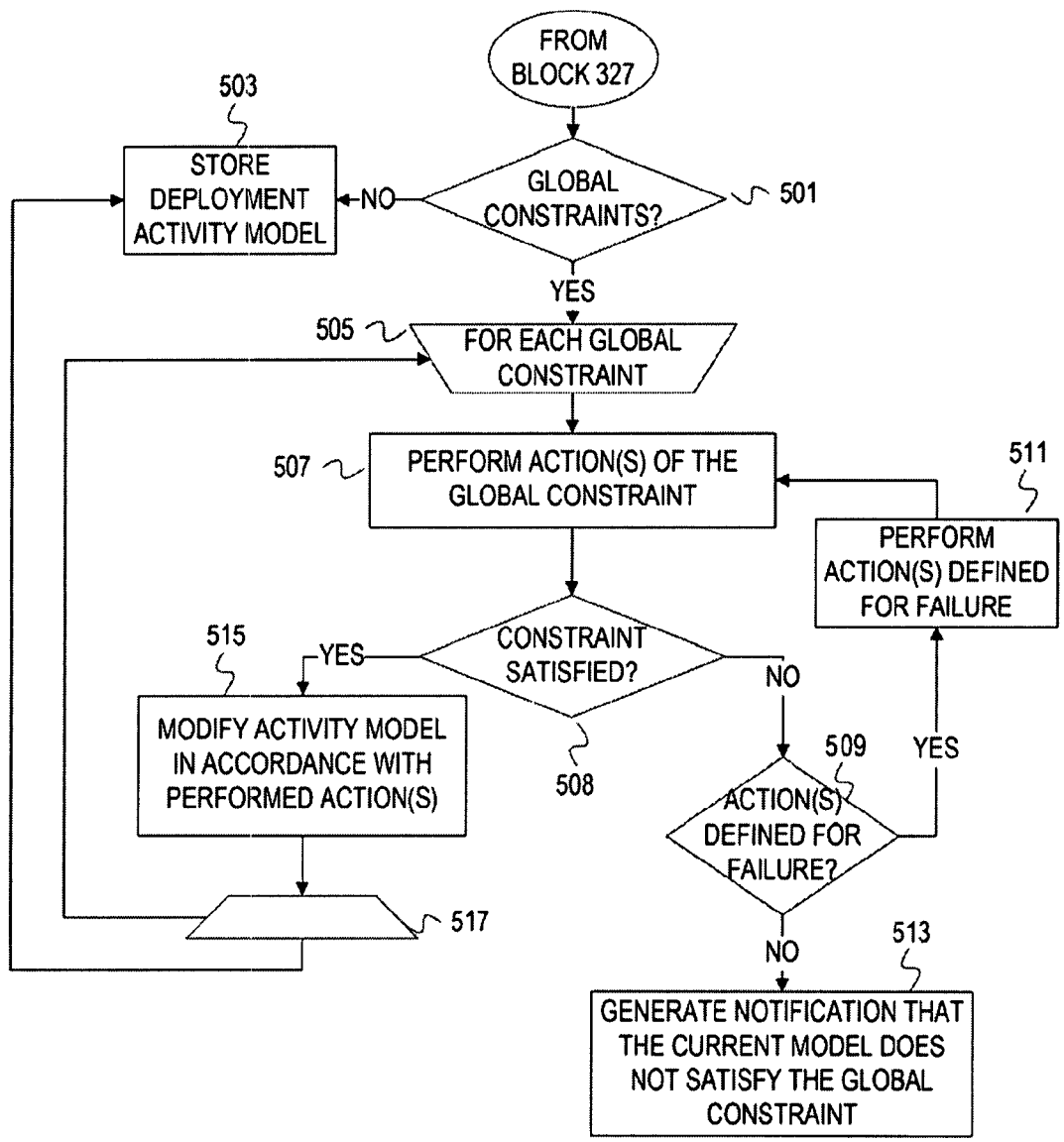

FIG. 5 depicts a fourth portion of the flowchart of example operations to automatically generate a deployment activity model from a semantically correct deployment topology model. At block 501, it is determined if there are any global constraints. If there are no global constraints, then control flows to block 503. If there are global constraints of the deployment topology model, then control flows to block 505.

At block 505, a loop of operations begins for each global constraint. At block 507, one or more actions of the global constraint are performed. At block 508, it is determined if the global constraint is satisfied. If the global constraint is satisfied, then control flows to block 515. If the global constraint is not satisfied, then control flows to block 509.

At block 509, it is determined if an action has been defined for failure of the global constraint. If an action is defined for failure, then control flows to block 511. If an action has not been defined, then control flows to block 513.

At block 511, the action(s) defined for the failure is performed. Control flows from block 511 back to block 507 to attempt satisfying the global constraint again.

At block 513, a notification is generated that the current deployment activity model does not satisfy the global constraint.

At block 515, the deployment activity model is modified in accordance with the one or more performed actions of the global constraint. Control flows from block 515 to block 517, which terminates the loop if all of the global constraints have been evaluated. Otherwise, control flows back to block 505.

If all of the global constraints have been evaluated and satisfied, then control flows from block 517 to block 503.

At block 503, the deployment activity model is stored.

With a semantically correct deployment activity model, executable code can be created to implement the modeled deployment. The semantically correct deployment activity model can be processed to generate one or more executable files with executable code units that correspond to the activities of the deployment activity model.

Figure 6:
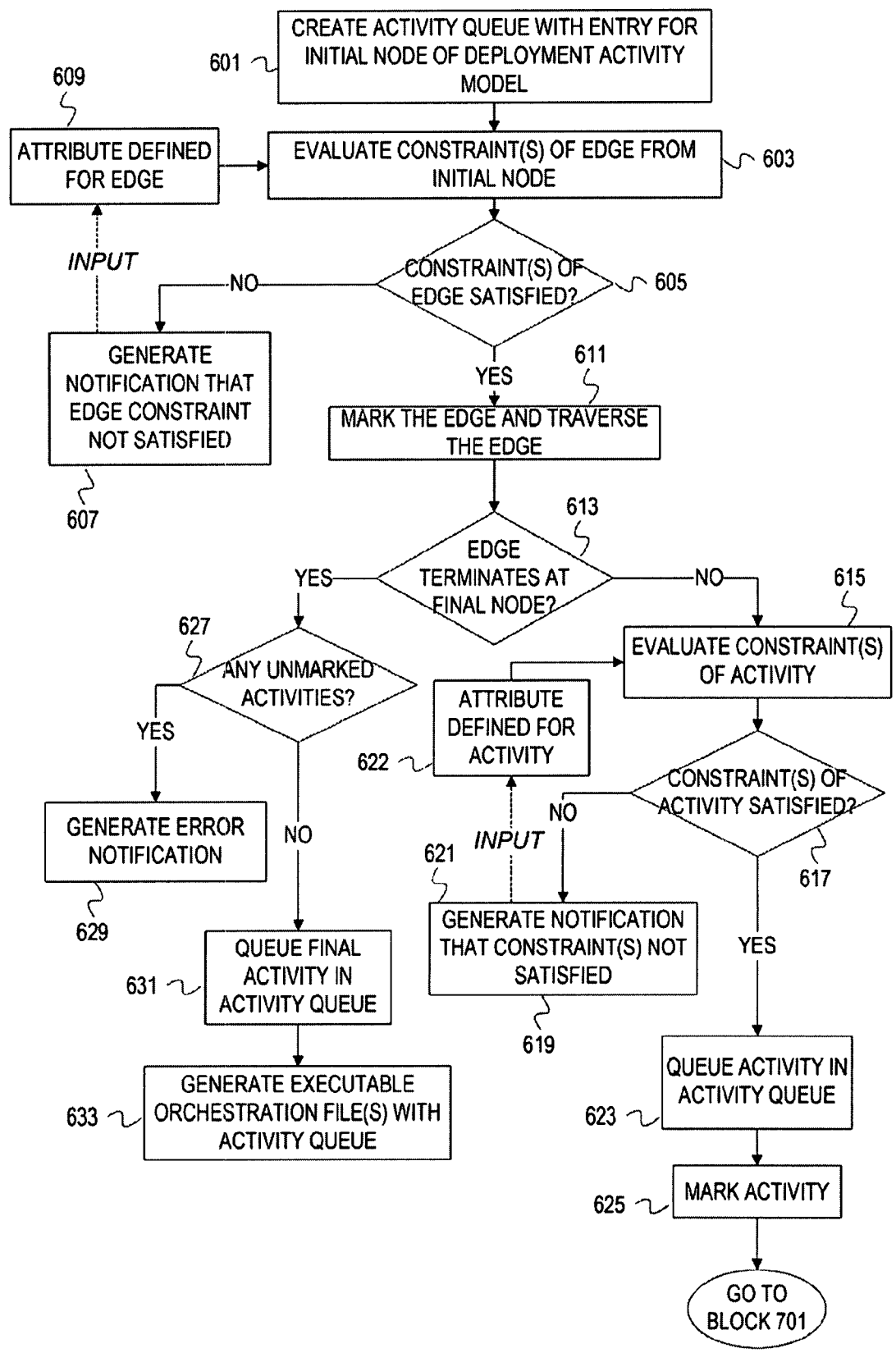
FIGS. 6-8 depict flowcharts of examples operations for generating executable code from a semantically correct deployment activity model.
Figure 7:
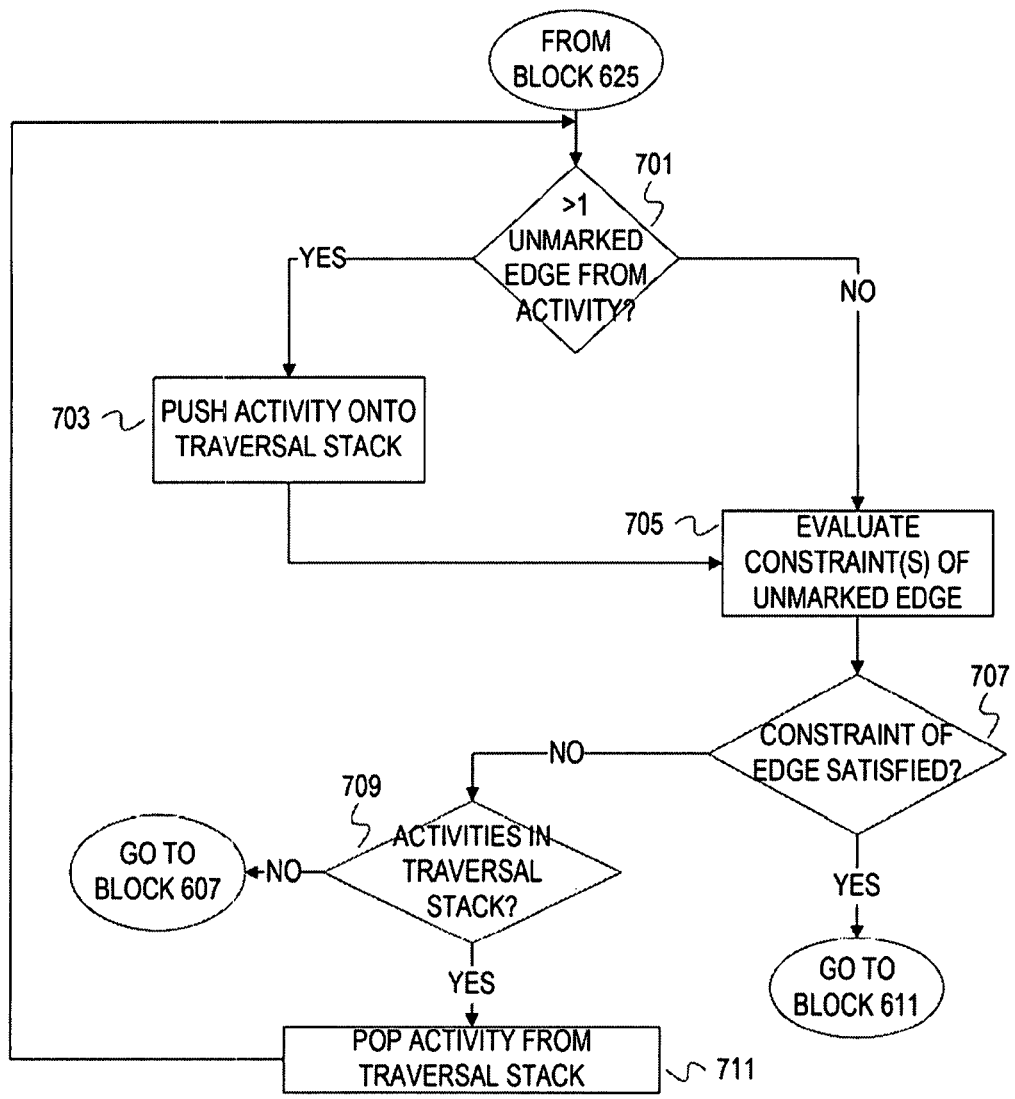
Figure 8:
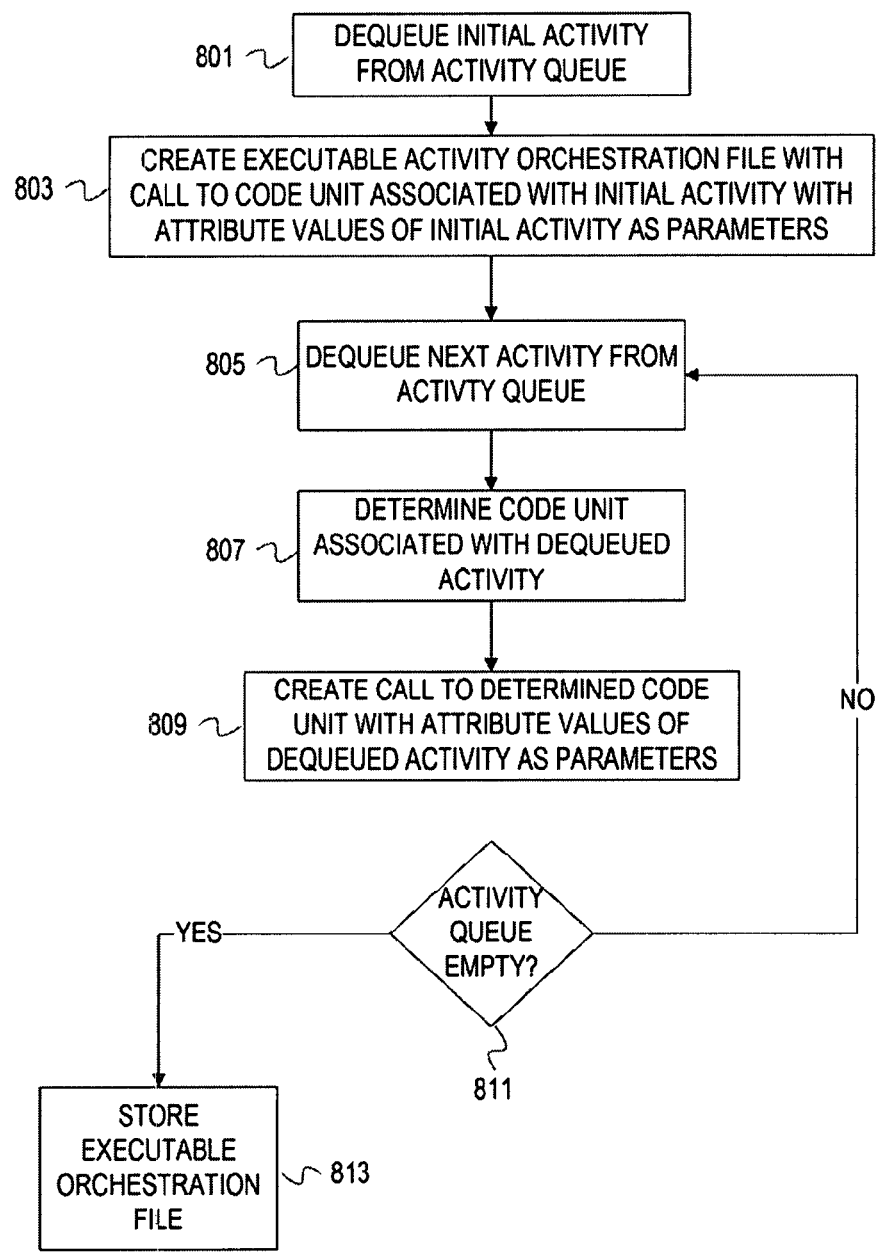

FIGS. 6-8 depict flowcharts of examples operations for generating executable code from a semantically correct deployment activity model. FIGS. 6-7 depict a flowchart of example operations for generating a linear representation of a semantically correct deployment activity model. FIG. 6 depicts a first portion of the flowchart of example operations for generating a linear representation of a semantically correct deployment activity model. At block 601, an activity queue is created with an entry for the initial node of a semantically correct deployment activity model. It should be understood that this example utilizes a queue to aid in understanding the inventive subject matter. A variety of structures, however, can be used as a linear representation of the deployment activity model. Regardless the particular realization, the linear representation expresses the deployment activity model in an essentially linear manner. At block 603, a constraint(s) of an edge from the initial node is evaluated. At block 605, it is determined if the constraint(s) is satisfied. If the constraint(s) is satisfied, then control flows to block 611. If the constraint(s) is not satisfied, then control flows to block 607.

At block 607, a notification is generated that the edge constraint is not satisfied. For instance, a prompt is generated requesting input of a value to define an attribute. A dashed line from block 607 to block 609 indicates flow of control after some input. For example, input is read from a file or input by a user. At block 609, an attribute is defined for the edge. Control flows from block 609 to block 603.

At block 611, the edge is marked and traversed. At block 613, it is determined if the edge terminates at the final node or an activity. If the edge terminates at the final node, then control flows to block 627. If the edge terminates at an activity that is not the final node, then control flows to block 615.

At block 615, the one or more constraints of the activity are evaluated. At block 617, it is determined if the evaluated constraint(s) is satisfied. If the constraint(s) is not satisfied, then control flows to block 619. If the constraint is satisfied, then control flows to block 623.

At block 619, a notification is generated that the constraint(s) was not satisfied. After receiving input to resolve the failure, control flows to block 622. At block 622, an attribute is defined for the activity. Control flows from block 622 back to block 615.

At block 623, the activity is queued in an activity queue. At block 625, the activity is marked. Control flows from block 625 to block 701 of FIG. 7.

If it was determined at block 613 that the traversed edge terminated at the final node, then it is determined if there are any unmarked activities at block 627. If there are unmarked activities of the deployment activity model, then control flows to block 629. If there are not unmarked activities of the deployment activity model, then control flows to block 631.

At block 629, an error notification is generated. The error notification may identify those of the activities that were not visited during processing of the deployment activity model.

At block 631, a final activity, if any, that corresponds to the final node is queued. At block 633, one or more executable orchestration files are generated with the activity queue.

FIG. 7 depicts a second portion of the flowchart of example operations for generating an intermediate representation of a semantically correct deployment activity model. At block 701, it is determined if there are multiple unmarked edges from the activity. If there are multiple unmarked edges from the activity, then control flows to block 703. If there is only one unmarked edge from the activity, then control flows to block 705.

At block 703, the activity is pushed onto a traversal stack. Control flows from block 703 to block 705.

At block 705, a constraint(s) of the unmarked edge is evaluated. At block 707, it is determined if the constraint(s) of the edge is satisfied. If the constraint(s) of the edge is satisfied, then control flows to block 611 of FIG. 6. If the edge of the constraint(s) is not satisfied, then control flows to block 709.

At block 709, it is determined if the traversal stack is empty. If the traversal stack is empty, then control flows to block 607 of FIG. 6. If the traversal stack is not empty, then control flows to block 711.

At block 711, an activity is popped from the traversal stack. Control flows from block 711 back to block 701. When an activity has multiple edges outgoing from the activity, the edges may require traversal in a particular order after certain conditions have been satisfied and/or after attributes have been defined.

FIG. 8 depicts a flowchart of example operations for generating executable code to orchestrate performance of the activities of the deployment activity model. At block 801, an initial activity is dequeued from the activity queue. At block 803, an executable activity orchestration file is created with a call to a code unit associated with the initial activity. For example, a deployment model tool searches a database for the activity or an entry for the activity, which indicates the code unit (e.g., function, library file, procedure, subroutine, script, etc.). The call to the code unit is created with attribute values for parameters. At block 805, the next activity is dequeued from the activity queue. At block 807, the code unit associated with the dequeued activity is determined. At block 809, a call to the determined code unit is created with attribute values of the activity as parameters. At block 811, it is determined if the activity queue is empty. If the activity queue is not empty, then control flows back to block 805. If the activity queue is empty, then control flows to block 813.

At block 813, the executable orchestration file is stored.

It should be understood that the above flowcharts are for understanding the inventive subject matter, and not for limiting embodiments of the inventive subject matter. Additional operations may be performed to process nested elements (e.g., nested activities or nested nodes). A deployment model may be graphically depicted with multiple deployment diagrams, including nested diagrams. For instance, an activity may represent another activity diagram. In addition, a deployment activity model may include decision nodes. Additional operations would be performed to traverse the model with decision nodes and create or look-up code to implement the decision nodes.

To create a deployment model, or any other model, profiles are used. Typically, profiles are created manually with stereotypes. The stereotypes define tagged values and constraints to be applied to a model associated with the profile. The resources expended creating these profiles can be recovered by creating a database with metadata to be used for automated profile generation. With the structure of the metadata as stored in a database, metadata in the database can be read and transformed into one or more profiles. Automated profile generated created profiles efficiently and allows for flexible creation of profiles. For instance, the same database can be used for different profiles by manipulating the transformation.

Figure 9:
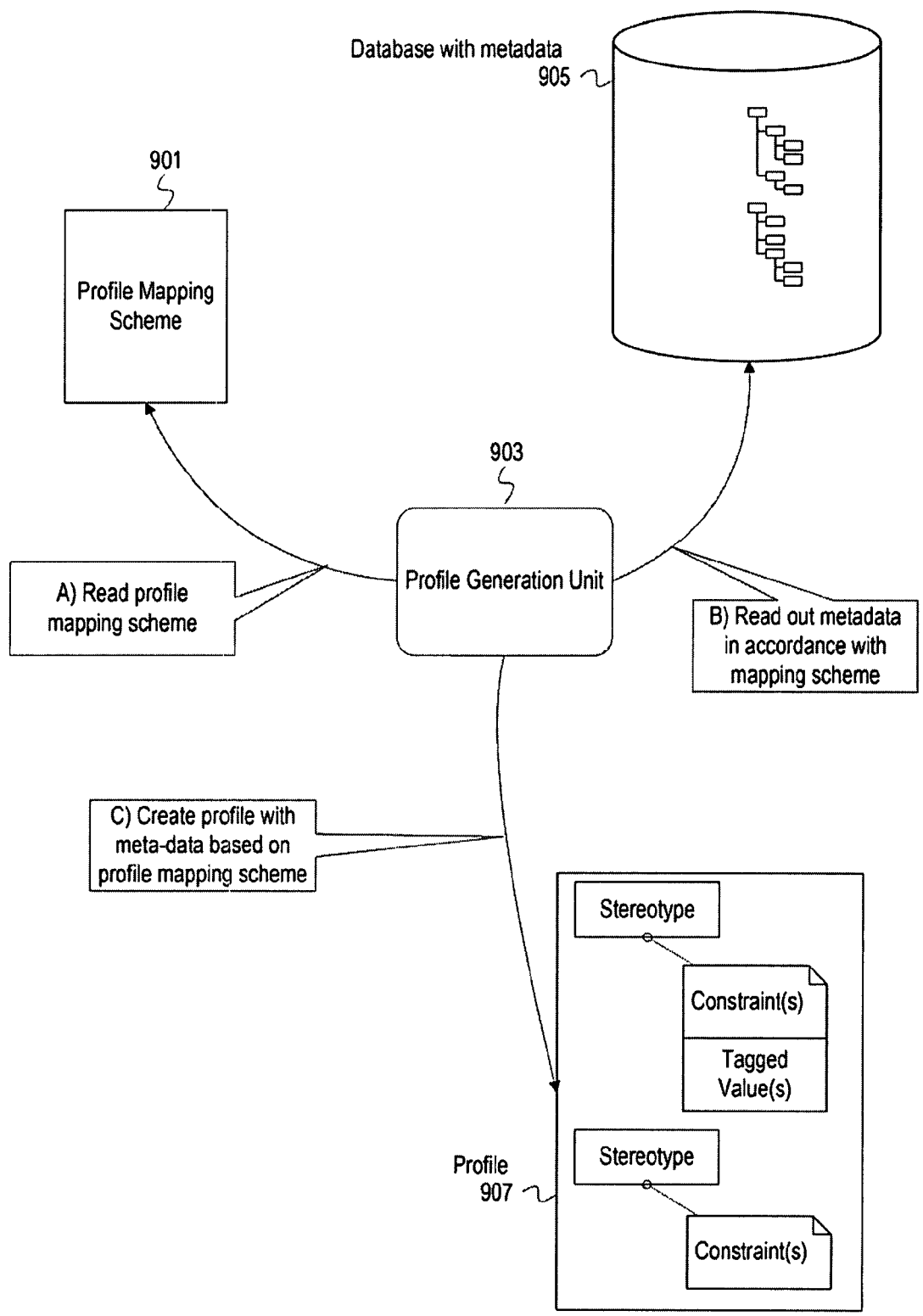
FIG. 9 depicts a conceptual example of transforming metadata in a database into a profile.

FIG. 9 depicts a conceptual example of transforming metadata in a database into a profile. A database 905 includes metadata. In a stage A, a profile generation unit 903 reads a profile mapping scheme 901. The profile mapping scheme maps the structure of the database to profile structure. Although only one mapping structure is depicted, the profile generation unit 903 can read multiple profiles to generate multiple profiles or to create a single profile from multiple mapping schemes, multiple databases, etc.

The profile generation unit 903 is depicted as a sole unit in FIG. 9. The profile generation unit may interface with a deployment model tool, be a component of the deployment model tool, etc.

In a stage B, the profile generation unit reads metadata from the database 905 in accordance with the profile mapping scheme 901. The one or more entries read by the profile generation unit 901 may be selected automatically (e.g., as defined in the profile mapping scheme, in accordance with a file, etc.) or manually (e.g., in accordance with parameters entered by a user).

In a stage C, the profile generation unit 903 creates a profile 907 with metadata. The profile 907 is created in accordance with the profile mapping scheme 901. For example, the database 905 is hierarchically structured so that each root entry corresponds to a profile. The next level corresponds to stereotypes. Although the mapping scheme may be highly detailed, the mapping scheme may also disregard details that are can be discerned by the tool or application that reads a resulting profile. For instance, the database may be structured to have different levels for constraints and tagged values. On the other hand, the database may be structured so that constraints and tagged values occupy the same level. The profile generation unit 903 does not need to be aware of which metadata correspond to constraints and which correspond to tagged values.

In addition to automated generation of profiles, leveraging profiles to define stereotypes for other profiles introduces efficiency into modeling. Although constraints can be inherited, constraints cannot be aggregated across profiles. Aggregating constraints across profiles leverages the labor invested in defining other profiles as well as adding flexibility to defining stereotypes.

Figure 10:
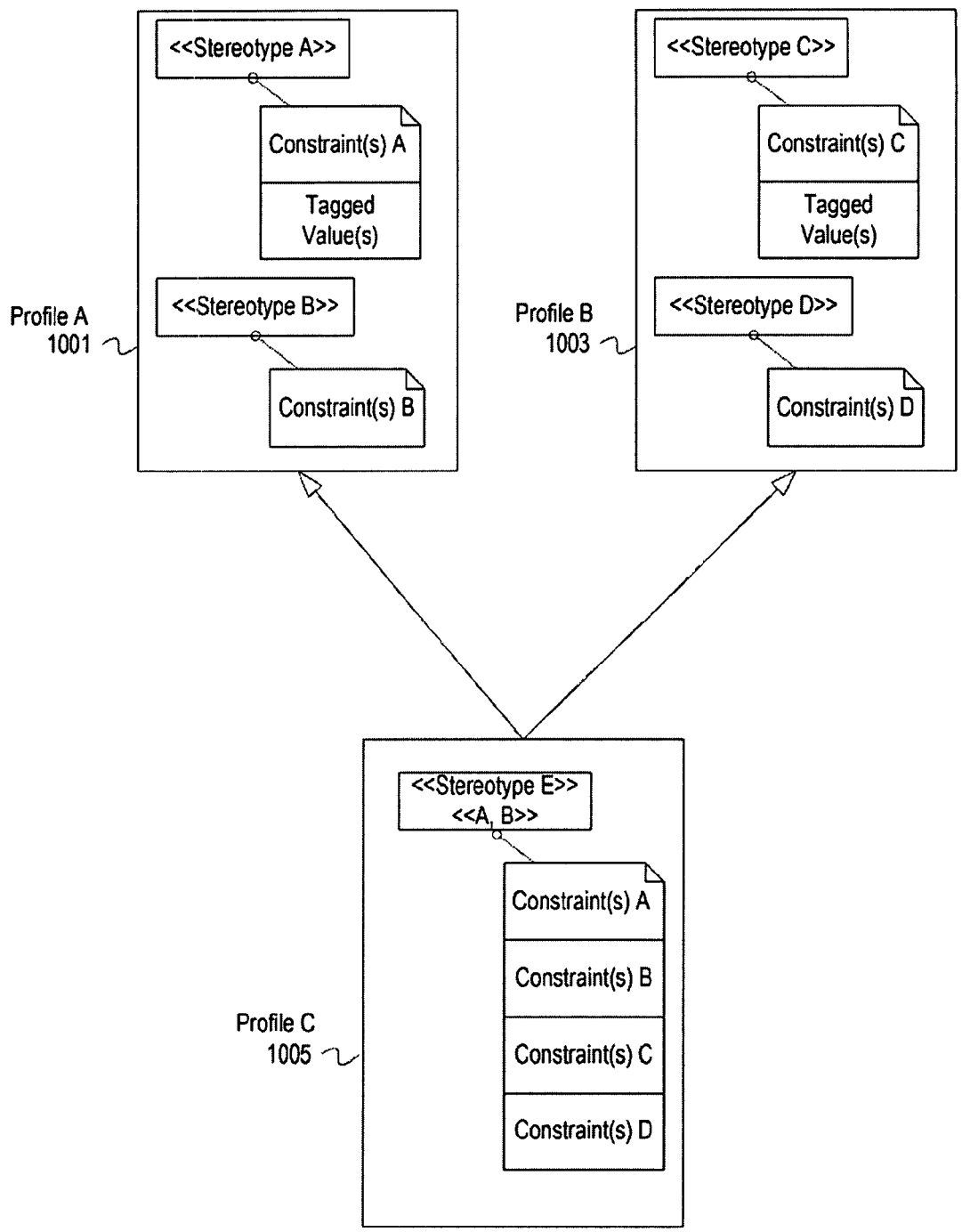
FIG. 10 depicts an example conceptual diagram of stereotype aggregation across profiles.

FIG. 10 depicts an example conceptual diagram of stereotype aggregation across profiles. A profile A 1001 is comprised of a stereotype A and a stereotype B. Stereotype A is defined with a constraint(s) A and tagged values. Stereotype B is defined with a constraint(s) B. A profile B 1003 is comprised stereotype C and a stereotype D. Stereotype C is defined with a constraint(s) C and tagged value(s). The stereotype D is defined with a constraint(s) D. A profile C 1005 is defined with a stereotype E. Stereotype E is annotated with a special tag that identifies profiles A and B 1001, 1003. Other techniques besides tagging can be used to associated a stereotype with profiles. The stereotype definition can reference the profiles with pointers, have identifiers for the profiles, etc. The stereotype E is defined with all of the constraints of the profiles A and B 1001, 1003. In other words, stereotype E is defined with the aggregation of the constraints A, B, C, D.

Figure 11:
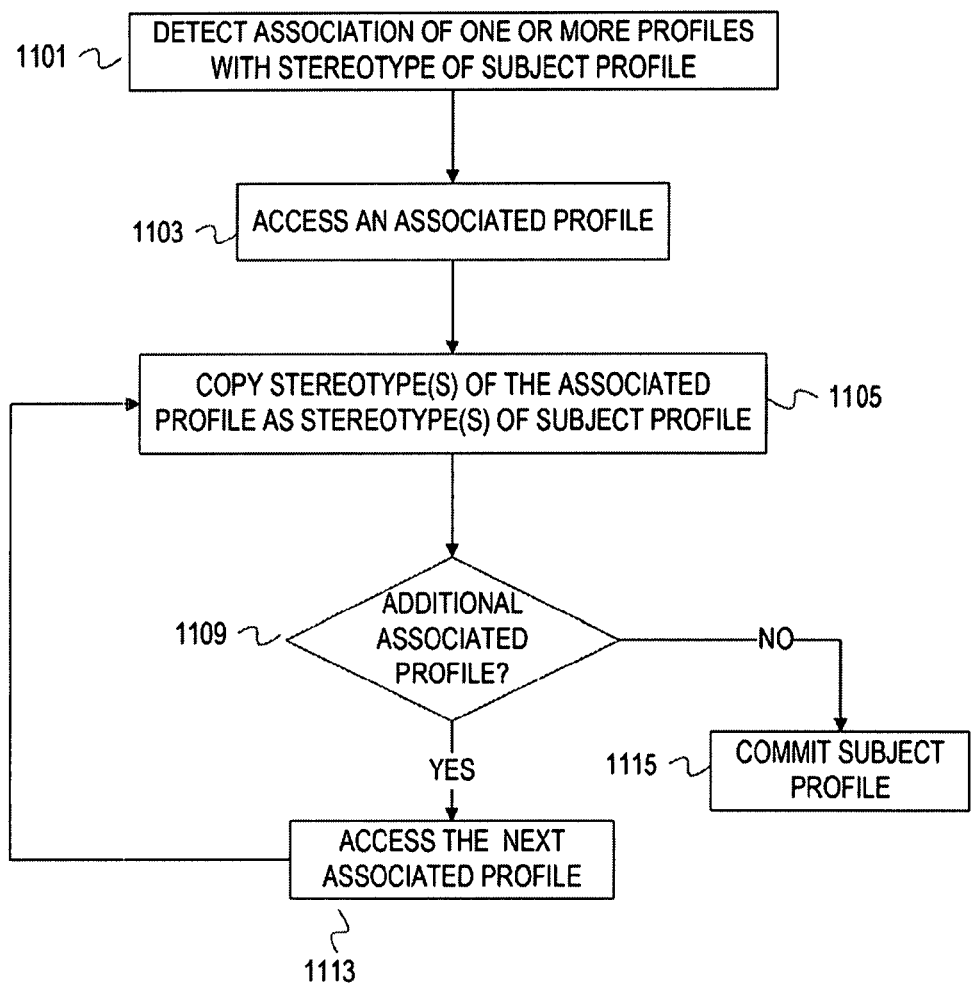
FIG. 11 depicts a flowchart of example operations for aggregating constraints across profiles to define a stereotype.

FIG. 11 depicts a flowchart of example operations for aggregating constraints across profiles to define a stereotype. At block 1101, an association of one or more profiles is detected for a stereotype. For example, when a model is loaded into a system, a tool or engine processes the model and encounters profiles with stereotypes indicating profiles for constraint aggregation. At block 1103, an associated profile is accessed. At block 1105, one or more stereotypes of the associated profile are copied as stereotype(s) of the subject profile. Of course, there may be zero stereotypes and one or more stereotypes associated with other profiles. Nested profile associations or nested constraint aggregation can be processed recursively, although not depicted in FIG. 11 in order not to obfuscate the inventive subject matter. At block 1109, it is determined if there are additional profiles associated with the subject profile. If there are additional associated profiles, then control flows to block 1113. If there are no further associated profiles, then control flows to block 1115.

At block 1113, the next profile associated with the subject profile is accessed. Control flows from block 1113 back to block 1105.

At block 1115, the subject profile is committed. Committing indicates that the profile is available for use. Committing may involve writing to a particular memory location, setting a flag, etc.

The example operations of FIG. 11 build an in-memory representation of a profile with a stereotype defined with aggregated constraints. Although FIG. 11 assumes a pass by value type of in-memory stereotype, the stereotype may be defined in memory with a reference to the profiles. Each time the stereotype is processed, the one or more references to profiles are followed to read the constraints of the associated profiles. An associated profile may include a stereotype that is associated with another profile, thus having nested constraint aggregation.

It should be realized that the above flowcharts are of example operations. The depicted operations may be performed in a different order, in parallel, etc. In addition, certain operations may not be performed, and additional operations may be performed.

The described embodiments may be provided as a computer program product, or software, that may include a machine-readable medium having stored thereon instructions, which may be used to program a computer system (or other electronic device(s)) to perform a process according to embodiments of the invention(s), whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Figure 12:
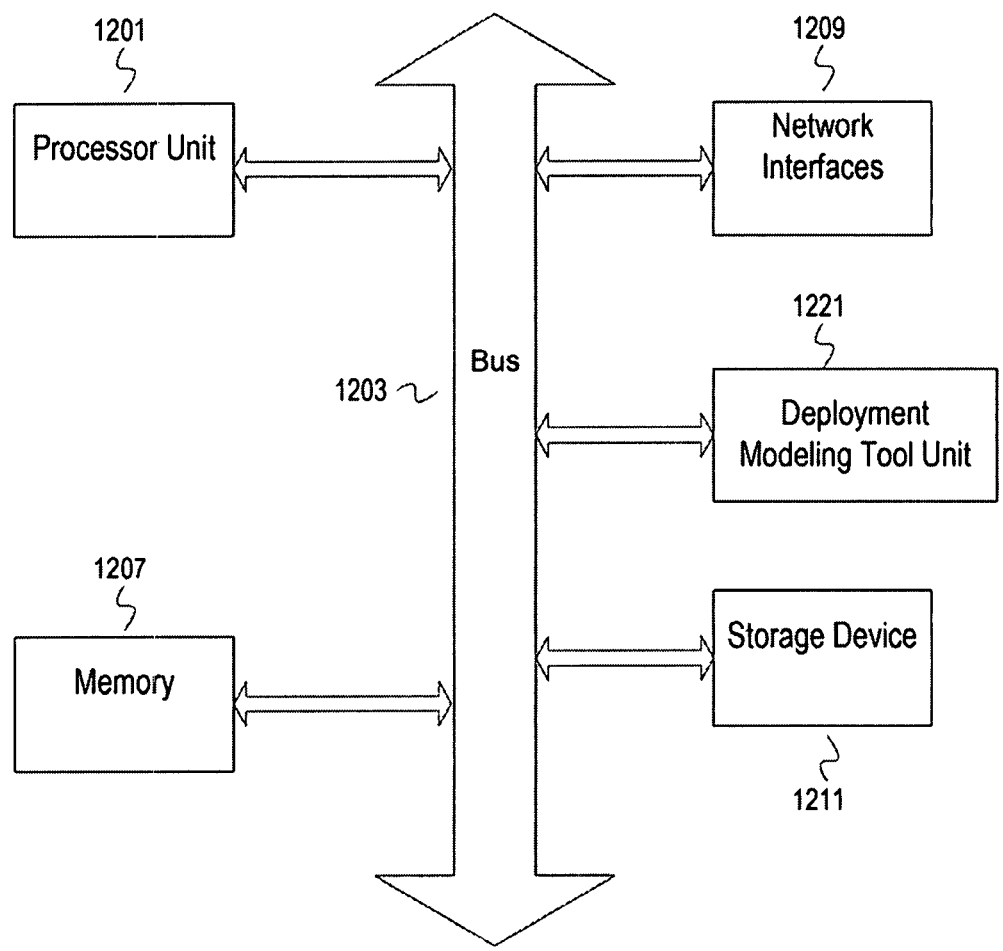
FIG. 12 depicts an example computer system.

FIG. 12 depicts an example computer system. A computer system includes a processor unit 1201 (possibly including multiple processors, multiple cores, multiple nodes, and/or implementing multi-threading, etc.). The computer system includes memory 1207. The memory 1207 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1203 (e.g., PCI, ISA, PCI-Express, HyperTransport®, infiniBand®, NuBus, etc.), a network interface 1209 (e.g., an ATM interface, an Ethernet interface, a Frame Relay interface, SONET interface, wireless interface, etc.), and a storage device(s) 1211 (e.g., optical storage, magnetic storage, etc.). The computer system also includes a deployment modeling tool unit 1221. The deployment modeling tool unit 1221 embodies functionality to implement embodiments described above. The deployment modeling tool unit 1221 may be partially or wholly embodied as instructions encoded in the system memory 1207 and/or the storage device 1211. The deployment modeling tool unit 1221 may also be implemented as logic in the processor unit 1201 and/or a co-processor unit, an application specific integrated circuit, etc. Further, realizations may include fewer or additional components not illustrated in FIG. 12 (e.g., video cards, audio cards, additional network interfaces, peripheral devices, etc.). The processor unit 1201, the storage device(s) 1211, the deployment modeling tool unit 1221, and the network interface 1209 are coupled to the bus 1203. Although illustrated as being coupled to the bus 1203, the memory 1207 may be coupled to the processor unit 1201.

While the embodiments are described with reference to various implementations and exploitations, it will be understood that these embodiments are illustrative and that the scope of the invention(s) is not limited to them. In general, embodiments as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method comprising:
processing data that represents a semantically correct deployment topology model, the deployment topology model comprised of nodes and connections;
determining a plurality of activities that correspond to the nodes and connections as occurring in the deployment topology model;
determining executable code units associated with the plurality of activities; and
writing calls to the executable code units into one or more files, the calls being written in accordance with an order of the plurality of activities that conforms to the semantically correct deployment topology model.

2. The method of claim 1, wherein said processing comprises evaluating constraints of the nodes and the connections.

3. The method of claim 2, wherein said evaluating comprises performing one or more actions associated with the nodes and connections.

4. The method of claim 3, wherein said determining the plurality of activities comprises generating the plurality of activities from performing the one or more actions.

5. The method of claim 1, wherein the deployment topology model is semantically correct in accordance with modeling language semantics defined in a modeling tool.

6. The method of claim 4, wherein the modeling language semantics are in accordance with a specification of the unified modeling language.

7. One or more machine-readable media having stored therein a program product, which when executed by a set of one or more processor units causes the set of one or more processor units to perform operations that comprise:
- processing data that represents a semantically correct deployment topology model, the deployment topology model comprised of nodes and connections;
- determining a plurality of activities that correspond to the nodes and connections as occurring in the deployment topology model;
- determining executable code units associated with the plurality of activities; and
- writing calls to the executable code units into one or more files, the calls being written in accordance with an order of the plurality of activities that conforms to the semantically correct deployment topology model.

8. The tangible machine-readable storage media of claim 7, wherein the operations further comprise:
- graphically depicting the nodes and connections; and
- evaluating the deployment topology model as the nodes and the connections are added to build a graphical depiction of the deployment topology model, the evaluating to ensure that the deployment topology model is semantically correct.

9. The tangible machine-readable storage media of claim 7, wherein said processing operation comprises performing one or more actions associated with the nodes and connections, wherein performing at least one of the actions evaluates one or more constraints of the nodes and the connections.

10. The tangible machine-readable storage media of claim 9, wherein said operation of determining the plurality of activities comprises generating the plurality of activities from performing the one or more actions.

11. The tangible machine-readable storage media of claim 7, wherein the deployment topology model is semantically correct in accordance with modeling language semantics defined in a modeling tool.

12. The tangible machine-readable storage media of claim 11, wherein the modeling language semantics are in accordance with a specification of the unified modeling language.

13. An apparatus comprising:
- a set of one or more processing units; and
- a modeling language tool unit operable to,
  - process data that represents a semantically correct deployment topology model, the deployment topology model comprised of nodes and connections;
  - determine a plurality of activities that correspond to the nodes and connections as occurring in the deployment topology model;
  - determine executable code units associated with the plurality of activities; and
  - write calls to the executable code units into one or more files, the calls being written in accordance with an order of the plurality of activities that conforms to the semantically correct deployment topology model.

14. The apparatus of claim 13, wherein the modeling language tool unit being operable to process comprises the modeling language tool being operable to evaluate constraints of the nodes and the connections.

15. The apparatus of claim 14, wherein the modeling language tool being operable to evaluate comprises the modeling language tool being operable to perform one or more actions associated with the nodes and connections.

16. The apparatus of claim 15, wherein the modeling language tool being operable to determine the plurality of activities comprises the modeling language tool being operable to generate the plurality of activities from performing the one or more actions.

17. The apparatus of claim 13, wherein the deployment topology model is semantically correct in accordance with modeling language semantics defined in a modeling tool.

* * * * *